June 24, 1930.  H. R. PRICE ET AL  1,766,764
PORTABLE DISPENSING DEVICE
Original Filed Feb. 6, 1928
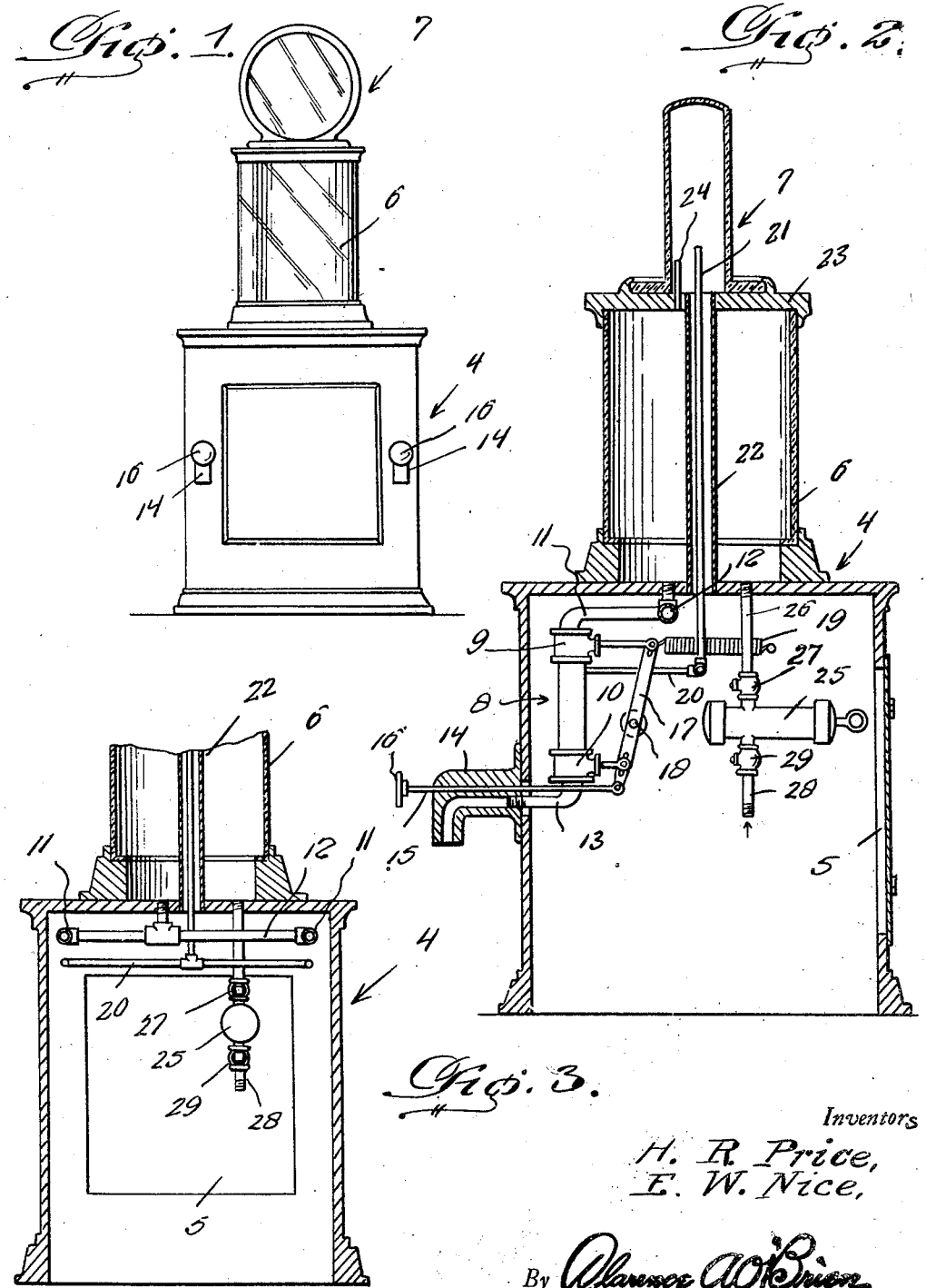
Inventors
H. R. Price,
E. W. Nice,
By Clarence A. O'Brien
Attorney Patented June 24, 1930

1,766,764

UNITED STATES PATENT OFFICE

HARRY R. PRICE AND EVERETT W. NICE, OF DETROIT, MICHIGAN; SAID PRICE ASSIGNOR TO SAID NICE

PORTABLE DISPENSING DEVICE

Application filed February 6, 1928, Serial No. 252,302. Renewed May 17, 1930.

The present invention relates to an especially constructed dispensing device for inflammable liquids, particularly adapted for dispensing liquids, such as are usable in pockets, cigar and cigarette lighters.

Our invention has for its object the dispensation of inflammable liquids from a miniature dispensing device to be operated at the will of the individual, the same being constructed for dispensing a predetermined quantity of the liquid, thus adapting it for filling cigar and cigarette lighters of the modern type from a store counter or the like.

Our principal aim has been to construct a device of this class which is characterized by an arrangement of novel details, associated in a manner to make for practicability, safety, utility and to assure the production of a structure of this class, which will fulfill the purposes for which it has been designed.

One object is the provision of a visible feed glass cylinder or tank indicating at all times the quantity of liquid contained in the dispenser.

Another object is the provision for filling the dispenser by means of a small pump, piping, and check valves arranged in a manner to facilitate refilling.

Another object is the incorporation, in a structure of a gauge which embodies a novel valving arrangement, manually controlled, to dispense a given quantity of the liquid at each operation of the control.

Other features and advantages of the invention will become more readily apparent from the following description and drawings:—

Figure 1 is a front elevation of a dispensing device constructed in accordance with the present invention.

Fig. 2 is an enlarged vertical section through the same with certain of the details in elevation.

Fig. 3 is a fragmentary sectional and elevational view taken at approximate right angles to Fig. 1.

Reference now being had to the drawings, by numerals, it will be observed that the reference character 4 designates generally, a pedestal or base of appropriate configuration, the same being of hollow construction to accommodate the internal mechanism, as plainly shown in Fig. 2.

On one side, it is formed with an opening to permit access to be had to the interior and a closing door 5 of appropriate construction providing for closing this opening when desired.

Incidentally, the door and opening serve to permit access to be had to the filling pump to be later described. Supported on top of the base is a transparent glass cylinder or reservoir 6 and supported on top of this, is an advertising head 7 of appropriate construction which, in practice, will be electrified for advantageous display purposes.

At this time, it is to be stated that the apparatus or device embodies a dual arrangement of discharge elements. However, the elements in each instance are the same, and a description of the mechanism on one side will suffice to permit a clear comprehension of both to be had.

Referring to Fig. 2 for example, it will be observed that the reference numeral 8 designates a vertically disposed gauge tube of appropriate proportion, adapted to contain a predetermined quantity of the inflammable liquid. This embodies an upper valve 9 and a lower valve 10, and it has communication with the cylinder 6 through the medium of a branch pipe 11, and a distributing pipe 12.

Incidentally, gravity is depended upon for discharging the liquid from the cylinder into the gauge tube 8. Moreover, the gauge tube has communication thru a small pipe 13, with the faucet or spigot 14, and this spigot is constructed to cooperate with the conventional cigar or cigarette lighter.

The spigot is also constructed to accommodate a slidable push rod 15 having a finger button 16 to render cooperation convenient. The push rod is connected with the lower end of a link 17 and it will be noticed that the link 17 is pivoted as at 18 between the center and one end. Between the lower end of the link and the valve 10 is an operating connection, and between the upper end of the link 17 and the valve 9 is another operating connection.

A spring 19 is attached to the latter connection and suitably anchored in the base. This serves to normally close the valve 10 and to hold the valve 9 open at this end. Obviously, these valves are successively operable.

At this time attention is invited to a vent pipe, one section of which is designated as at 20, and a vertical section of which is designated as at 21. The latter section 21 extends up through a liquid-proof tube 22 which is connected with the base and the top of the cylinder 23 as represented in Fig. 2.

Incidentally, there is an additional vent tube at 24, for the glass cylinder 6.

Considering further Fig. 2, it will be observed that the numeral 25 designates a small filling pump connected with the cylinder 6 through the medium of a short pipe section 26. In the pipe section 26 is a check valve 27. In addition, there is a hose connection 28, in which a valve 29 is located. As before indicated, this pump is accessible through the door 5. The valves 27 and 29 being of the check type, are alternately operable.

In practice, the reservoir or cylinder is first filled with an appropriate liquid such as used in the present-day cigar and cigarette lighter of the pocket type. To effect the filling of cylinder 6 the hose from the container (not shown) is connected with the pipe 28, after the door 5 is opened. Then the plunger of the pump 25 is manipulated by hand and on the suction stroke the liquid is drawn into the pump cylinder. Then on the power stroke it is forced up through the pipe 26 into the cylinder 6. The valves 27 and 29 operate alternately or in succession to accomplish this result.

The individual desiring to fill his lighter, merely presses upon the button 16, forcing the push rod 15 inwardly. This rocks the arm or link 17 upon its pivot to open the valve 10 and to allow the liquid to flow by gravity out through the spigot 14 and into the lighter. It will be noticed that because of the arrangement of the pivot 18, the valve 10 opens gradually, while the valve 9 closes promptly. This is a desirable feature in a device of this class, as is obvious, for it permits the gauge tube 8 to fill wholly and prevents overflowing the lighter.

By making a careful analysis of the preceding description in association with detailed drawings, a clear comprehension of the construction and operation will be had. Therefore, a more lengthy description is regarded unnecessary.

Minor changes in shape, size, and arrangement of parts may be resorted to within the scope of the adjoined claims.

Having thus described our invention, what we claim as new is:—

1. A liquid dispenser for filling pocket cigar and cigarette lighters comprising a hollow supporting base, a transparent reservoir supported on said base and having communication with the interior of said base, a manually controlled pump arranged within said hollow base, means for supplying liquid from a suitable container to said pump, fluid conducting means leading from said pump to said reservoir, a vertically disposed gage tube arranged within said hollow base, for containing a predetermined quantity of liquid, a fluid conducting pipe leading from said reservoir and communicating with said gage tube at the upper end of said tube, whereby fluid may be fed by gravity from the reservoir to said gage tube, upper and lower valves arranged within said gage tube, means operatively connecting said valves, whereby said valves may be simultaneously actuated, said last mentioned means including spring means for normally maintaining the upper valve in an open position and the lower valve in a closed position, a dispensing spigot mounted on said base exteriorly of said base, a pipe leading from the lower end of said gage tube and communicating with said dispensing spigot, a rod slidably mounted in said dispensing spigot, and means operatively connecting said rod with said valve connecting means whereby said upper valve may be moved to a closed position and said lower valve moved to an open position, all in the manner and for the purpose specified.

2. A liquid dispenser for filling pocket cigar and cigarette lighters comprising a hollow supporting base, a transparent reservoir supported on said base and having communication with the interior of said base, a manually controlled pump arranged within said hollow base, means for supplying liquid from a suitable container to said pump, fluid conducting means leading from said pump to said reservoir, a vertically disposed gage tube arranged within said hollow base, for containing a predetermined quantity of liquid, a fluid conducting pipe leading from said reservoir and communicating with said gage tube at the upper end of said tube, whereby fluid may be fed by gravity from the reservoir to said gage tube, upper and lower valves arranged within said gage tube, means operatively connecting said valves, whereby said valves may be simultaneously actuated, said last mentioned means including spring means for normally maintaining the upper valve in an open position and the lower valve in a closed position, a dispensing spigot mounted on said base exteriorly of said base, a pipe leading from the lower end of said gage tube and communicating with said dispensing spigot, a rod slidably mounted in said dispensing spigot, and means operatively connecting said rod with said valve connecting means whereby said upper valve may be moved to a closed position and said lower valve moved to an open position, said hollow base being provided with an opening whereby access may be had to the interior thereof, a door hingedly mounted in the opening for closing said opening, and a vent pipe leading from said gage tube, said vent pipe having its free end exposed exteriorly of said reservoir.

In testimony whereof we affix our signatures.

HARRY R. PRICE.
EVERETT W. NICE.